Nov. 22, 1955  C. H. SCHOWALTER  2,724,372
ENGINE CYLINDER SCAVENGING
Filed Aug. 5, 1952  5 Sheets-Sheet 4
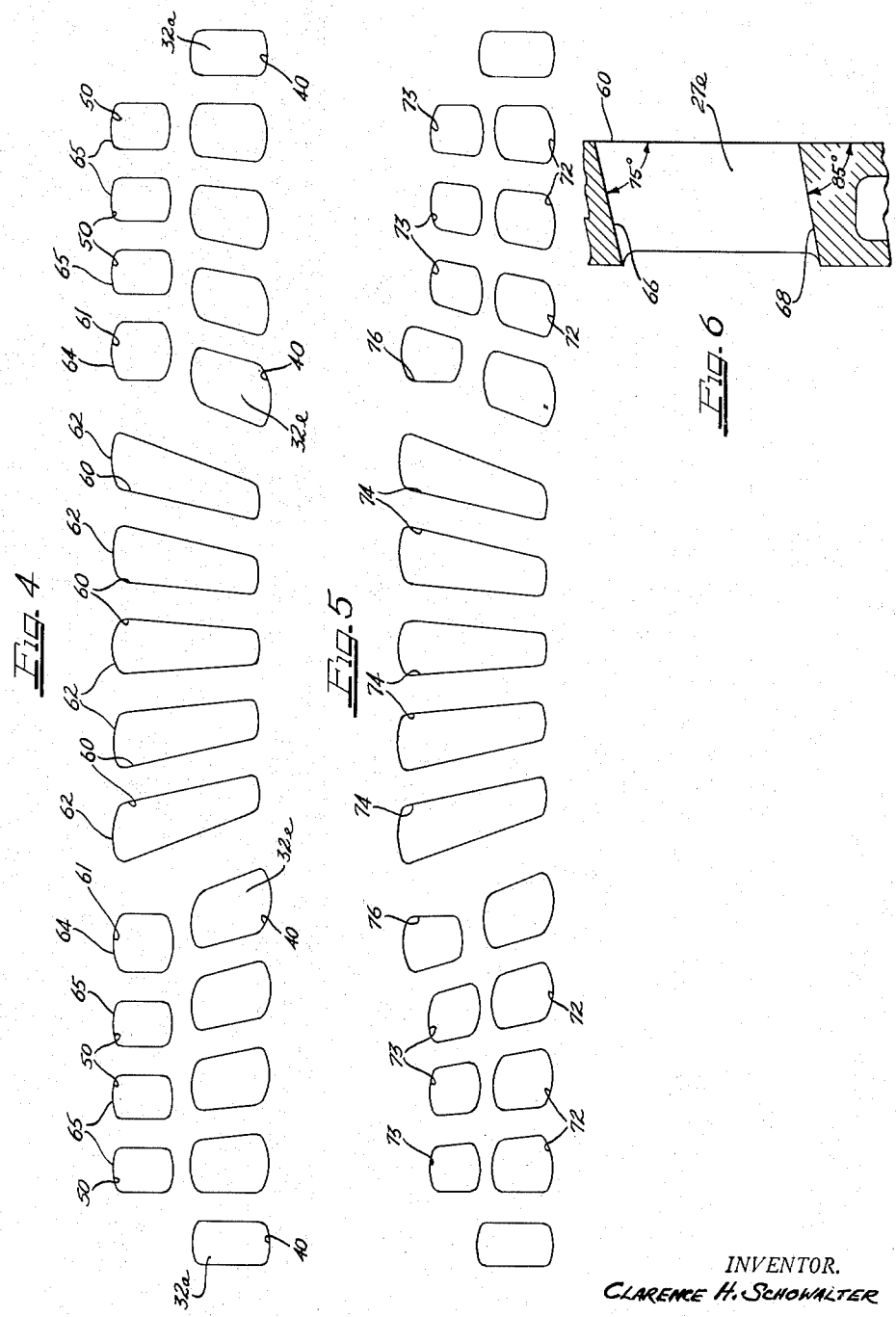
INVENTOR.
CLARENCE H. SCHOWALTER
BY
Paul L. Krohn
ATTY.

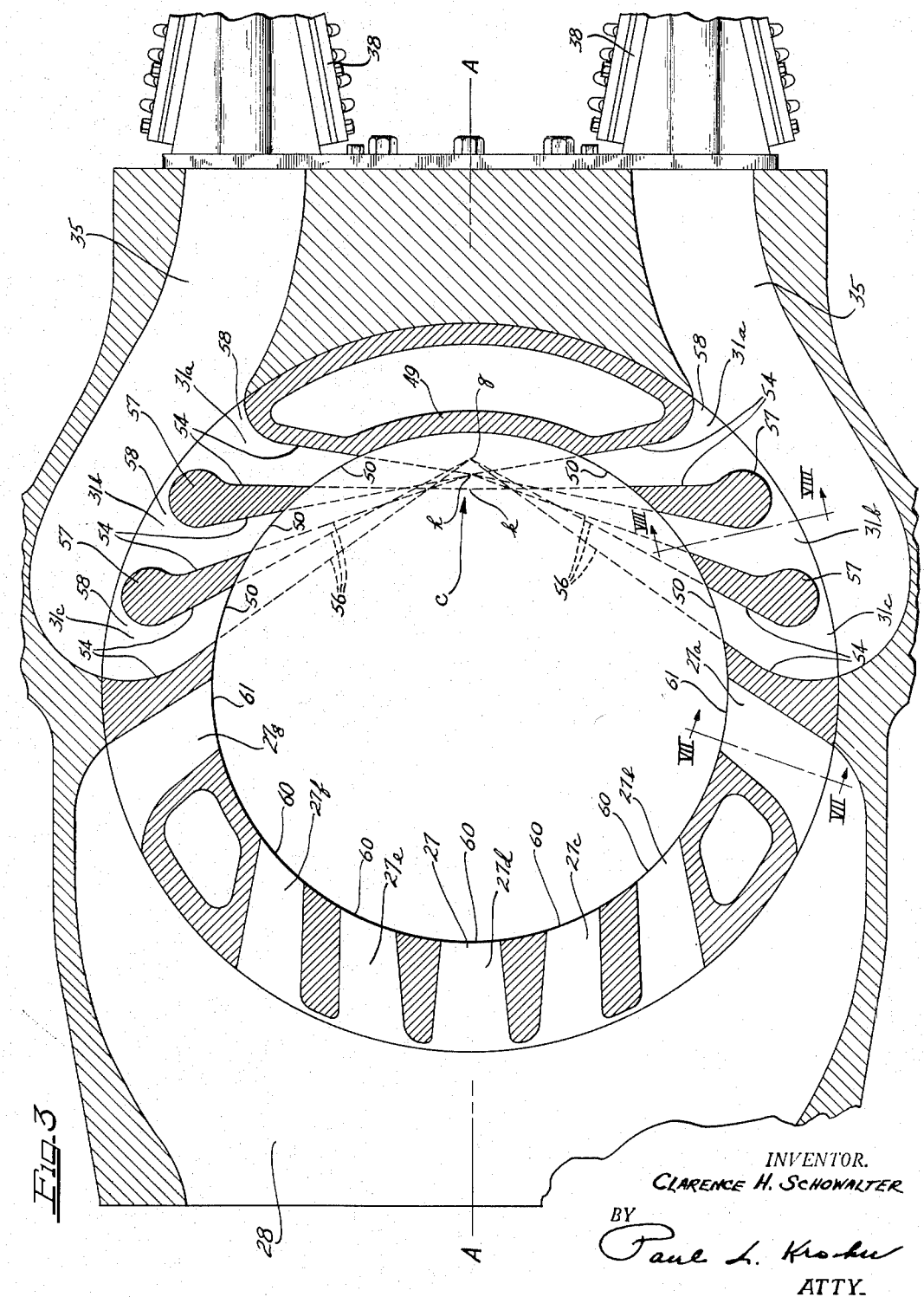

Nov. 22, 1955 — C. H. SCHOWALTER — 2,724,372
ENGINE CYLINDER SCAVENGING
Filed Aug. 5, 1952 — 5 Sheets-Sheet 5
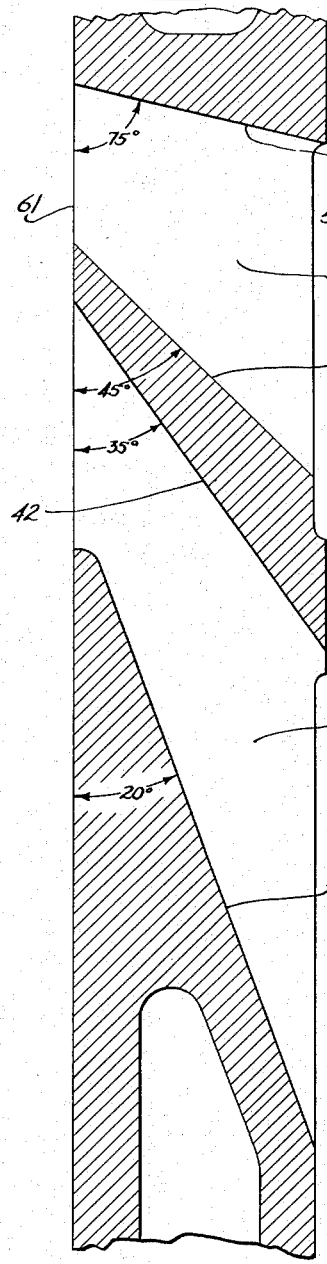
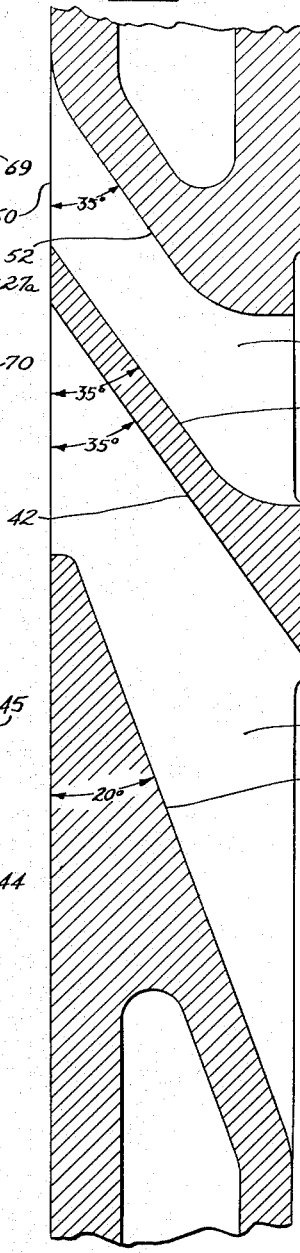
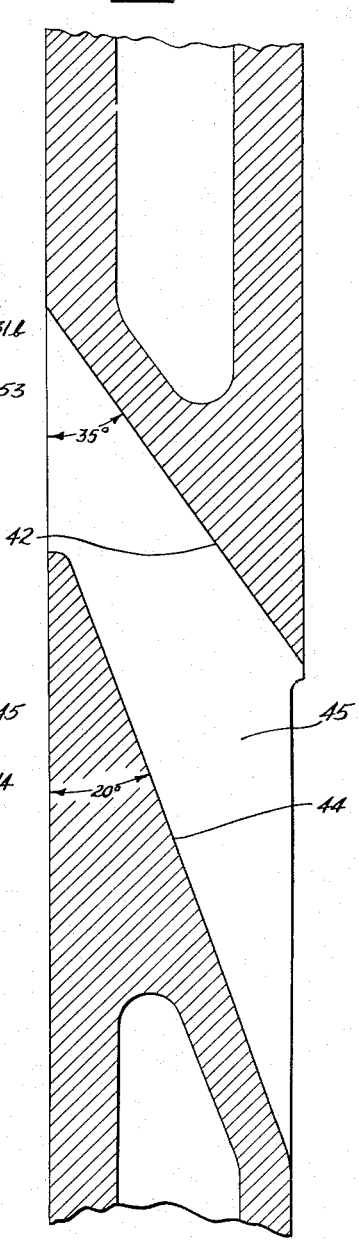
INVENTOR.
CLARENCE H. SCHOWALTER
BY Paul L. Kroher
ATTY.

United States Patent Office 2,724,372
Patented Nov. 22, 1955

2,724,372

ENGINE CYLINDER SCAVENGING

Clarence H. Schowalter, Beloit, Wis., assignor to Fairbanks, Morse & Co., Chicago, Ill., a corporation of Illinois Application August 5, 1952, Serial No. 302,765

11 Claims. (Cl. 123—65)

This invention relates to improvements in internal combustion engines, and more particularly to improvements in cylinder scavenging and cylinder admission of combustion air in engines of two cycle, high compression type suitable for operation on liquid fuel, as a Diesel engine, or on gaseous fuel with ignition thereof effected by suitable means such for example, as liquid fuel admitted in small or pilot quantity and compression-ignited in the cylinder.

While the present improvements may be employed to advantage in two cycle Diesel engines per se, the particular improvements contemplated by the present invention are especially applicable to high compression gaseous fuel engines, for the purpose of improving engine operation and obtaining increased engine power output through more effective cylinder scavenging and control of gaseous fuel-air mixture. Since in two cycle engines of this character, efficiency and power output are directly dependent in large part, upon the character and uniformity of gas and air mixtures in combustion and the effectiveness and extent of cylinder scavenging, relatively close control of the latter factors is highly important and essential to good engine operation. Comparatively speaking, the degree of control of the aforementioned factors is considerably more exacting for proper operation of gaseous fuel engines of the character indicated, than is required for effective operation of conventional two cycle Diesel engines.

Accordingly, it is an object of the present invention to provide an improved arrangement of cylinder intake and exhaust porting for a two cycle, high compression engine having the intake and exhaust ports in the cylinder wall and piston controlled, wherein the form and relative arrangement of the ports are such as to afford a markedly improved cylinder scavenging of exhaust gases and products of combustion without by-pass of scavenging air to the exhaust ports, and to effect supply of air in proper volume for combustion mixture with the gaseous fuel in the cylinder, with the combustion air admitted to the cylinder such as to avoid gas stratification and the formation of cylinder pockets of relatively rich gas-air mixtures. Prevention of localized zones or pockets of rich gas-air mixtures in the cylinder is highly important as will be fully appreciated, as otherwise auto-ignition of such rich mixtures would occur in the compression period, with resultant detonation of the cylinder charge and consequent reduction in engine power output.

Another object is to provide, for an engine of the character indicated, cylinder intake and exhaust ports of such improved form and relative arrangement as to result in a more effective directional flow of scavenging air in the cylinder for assuring substantially complete cylinder scavenging, as well as a more rapid exhaust discharge or cylinder exhaust "blow-down" through quick development of an adequately large exhaust port area, the port arrangement further being adapted partly through valve control of certain of the intake ports, for providing relatively high mean effective scavenging and air charging pressures in the cylinder.

A further object is to afford in an engine of the character indicated, an improved system of air intake and exhaust ports providing the several advantages hereinbefore objectively stated, and affording effective cylinder scavenging in such efficient manner as to enable an appreciable reduction in the volume of air required, thereby reducing blower operating power requirements while increasing the net power output of the engine.

The foregoing and other objects and advantages of the present invention will appear from the following description of embodiments thereof illustrated by the accompanying drawings, wherein:

Fig. 3 is a similar enlarged, horizontal section through the cylinder, as viewed from line 3—3 in Fig. 1.

Fig. 4 is a developed view of the air intake and exhaust ports of the cylinder.

Fig. 5 is a developed view of a modified arrangement of exhaust and air ports.

Fig. 6 is a vertical section through an exhaust port, as taken along line 6—6 in Fig. 2.

Fig. 7 is a vertical section transversely of the cylinder wall in a zone of an air port and an exhaust port thereabove, as taken in a vertical plane along line 7—7 in Fig. 3.

Fig. 8 is a vertical section transversely of the cylinder wall in a zone of superposed air ports, as taken in a vertical plane along line 8—8 in Fig. 3.

Fig. 9 is a vertical section transversely of the cylinder wall in a zone thereof containing one air port, the view being along line 9—9 in Fig. 2.

Figure 1:
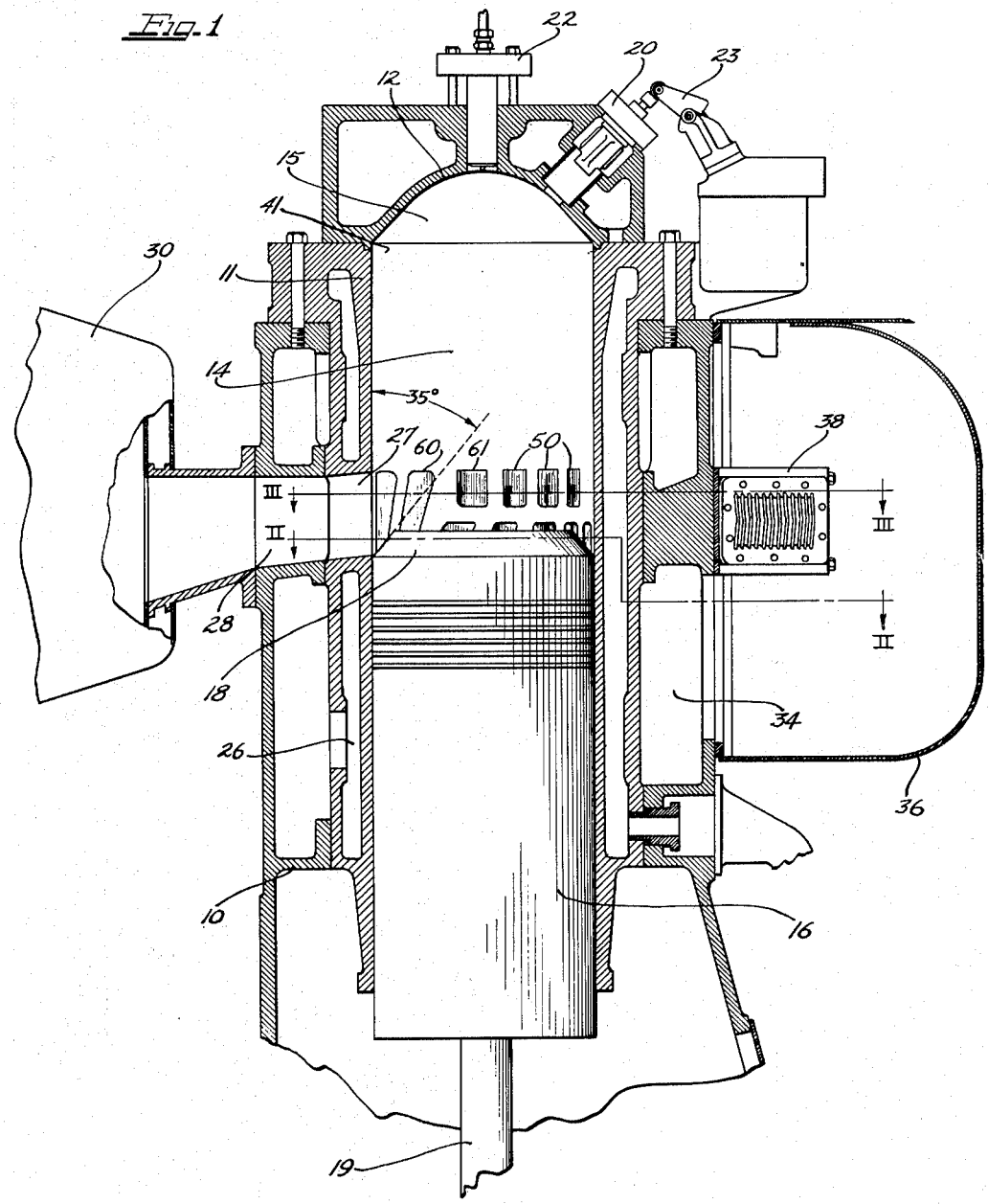
Fig. 1 is a vertical transverse section through a cylinder assembly of an engine shown partly in elevation, showing the cylinder having exhaust and air ports according to the present invention.

Referring first to Fig. 1, the view illustrates in vertical section, a cylinder and piston assembly of a high compression internal combustion engine of two-cycle type which may be adapted for dual-fuel operation, as alternatively on liquid fuel alone or on gaseous fuel ignited in suitable manner, as by a pilot charge of liquid fuel. Since the improved cylinder port arrangement of the present invention is directed particularly to obtaining efficient operation of the engine on gaseous fuel, the following description of the port system will be presented in respect to gas operation of the engine.

The engine as shown, provides a frame structure generally designated by the numeral 10, supporting one or more cylinder organizations only one of which is illustrated as including a cylinder 11 and cylinder head member 12 forming combustion chamber 14 extending into the cylinder head as at 15. Operative in the cylinder is a suitable piston 16 having a frusto-conical crown 18 (later to be referred to), the piston being connected to the engine crankshaft (not shown) through connecting rod 19. Carried by the cylinder head member are a valve device 20 of suitable character for controlling cylinder admission of gaseous fuel, and liquid fuel admission means such as valve 22. Valve 20 may be engine-actuated through a rocker arm 23 to determine gas valve opening at the proper time in the fuel admission-compression cycle of the engine during engine operation on gas fuel, while for diesel operation of the engine, liquid fuel is pumped by suitable fuel injection pump means not shown, to the valve means 22 for cylinder injection. In gas operation of the engine, the gas-air mixture is ignited by any suitable, desired ignition means which for example, may be a predetermined small volume or pilot charge of liquid fuel injected into the cylinder, as through valve 22 for instance, and compression-ignited therein. The gas ignition means is not here shown, since it does not form any material part of the present invention.

The cylinder 11 preferably is of double-walled construction to provide a jacket space 26 for cooling fluid, and is formed to provide a plurality of exhaust port passages 27 in communication with a discharge chamber 28 in the engine frame, the latter opening to an exhaust discharge manifold generally indicated at 30. The cylinder further provides upper and lower rows of air port passages 31 and 32 respectively, the lower row opening to the air space 34 between the cylinder and frame, while the upper row 31 is divided as shown by Fig. 3, with the division separately supplied with air through air delivery passages 35 in the frame (Fig. 3). An air conduit or distribution manifold 36 delivers air under a suitable, predetermined pressure, to the space 34 for cylinder admission through port passages 32, and to the separate passages 35 through unidirectional air valve devices 38 of any suitable construction, for cylinder delivery by the port passages 31. Such scavenging and charging air supply in the manifold 36, may be established in usual manner, as by suitable blower means (not shown) which may be either engine-driven or operated by separate power means as an electric motor or the like.

Figure 2:
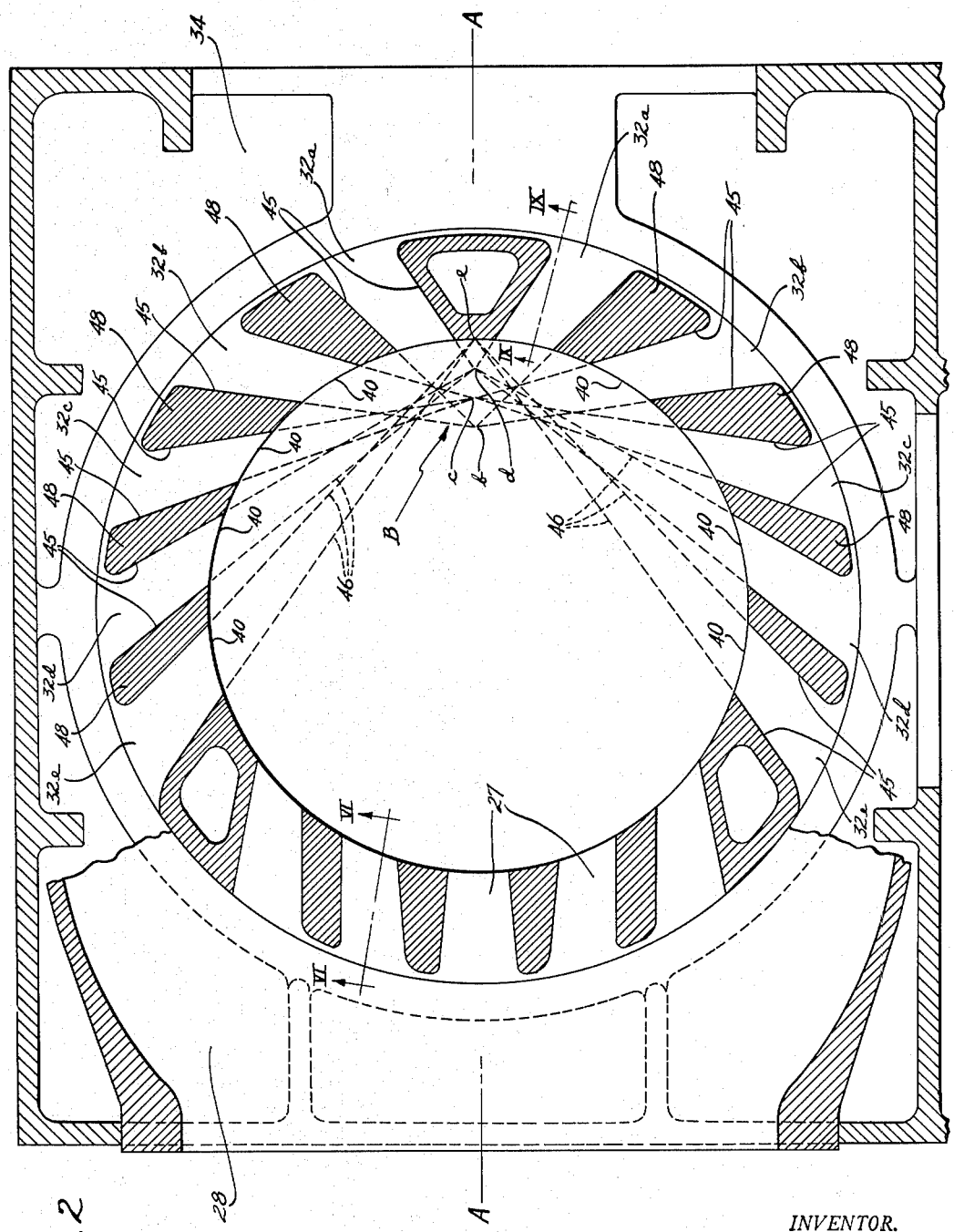
Fig. 2 is an enlarged, horizontal section through a cylinder, as taken along line 2—2 in Fig. 1.

Referring particularly to Fig. 2, the air port passages 32 of the lower row are distributed in circumferentially spaced relation on opposite sides of a median longitudinal plane A—A through the cylinder center, and over somewhat more than half the cylinder circumference. In the example illustrated, the circumferential extent of passage distribution approaches approximately two-thirds of the cylinder circumference, while the passage distribution preferably is symmetrical with respect to the median plane. The passages 32 terminate in air intake openings or air ports 40, and each passage is inclined in the cylinder wall (Figs. 7, 8, and 9) toward the outer or head end 41 of the cylinder (Fig. 1). According to the present example, five such passages 32 are shown on each side of the median plane A—A, as the passages 32a, 32b, 32c, 32d, and 32e each of which is formed to have its top wall 42 (Figs. 7, 8, and 9) directed at an angle to the cylinder bore of about 35 degrees, and its bottom wall 44 at an angle to the cylinder bore of about 20 degrees, while the side walls 45 converge toward the port end of the passage (Fig. 2). Moreover and as may be observed from the developed view of the port system shown in Fig. 4, the ports and passages with the exception of the first passage 32a and its port 40, are preferably canted in progressively greater degree, as with the end passage 32e and its port canted to the greatest extent. Consequently, the passages 32a to 32e as thus formed, constitute venturi-like nozzles which function to effect increased velocity of air delivery to the cylinder.

Referring again to Fig. 2, all of the air passages 32a to 32e are directed as shown, such that the side walls 45 thereof lie in planes which as indicated by the broken line projections 46, intersect the median plane A—A in a zone B thereof extending longitudinally of the cylinder adjacent the cylinder wall at the side thereof opposite the exhaust port passages 27. It thus will appear also, that the wall elements 48 between adjacent passages on both sides of the median plane, lie in planes which intersect the median plane in the same zone B. Consequently, by the described formation and directioning of the air port passages 32a to 32e on opposite sides of the median plane, these passages will serve to introduce jets of air through the ports 40 into the cylinder and upwardly therein in a columnar stream along that side of the cylinder which is opposite the side containing the exhaust port passages. As before indicated, the air supply to the passages 32a to 32e is from the supply manifold 36 through the space or chamber 34 in the frame, the latter chamber being common to all of these passages, as shown in Fig. 2.

More particularly as to the sectional view of Fig. 2, the relative directioning of the side walls of the several port passages 32a to 32e at each side of the median plane A—A, is such as to cause the air jets in admission to the cylinder, to flow along paths which in extending upwardly in the cylinder toward the cylinder head end as determined by the described inclination of the port passages, pass through a zone of mutual intersection in their approach to the median plane A—A. Thus the several air jets or air streams are desirably united and commingled in the zones or cylinder regions of such mutual intersection obtaining on opposite sides of the median plane, with all of the air streams then forming a united columnar flow upwardly in the cylinder along its side opposite the exhaust port side. The foregoing is exemplified by the mutual intersection of the broken lines 46 at each side of the median plane, in their extension to intersection with the latter plane. Accordingly, the directioning of the port passage side walls 45 to attain this result, may be indicated by reference to the broken lines 46 which as hereinbefore noted, are lines in the planes of the side walls. As shown by Fig. 2, the lines 46 in extension from the side walls 45 of each passage 32e, converge to intersection with the median plane A—A at the point e thereof which is substantially at the cylinder wall surface, while those lines 46 in extension from the side walls 45 of each port passage 32d, converge to intersection with the median plane at the point d thereof in the bore of the cylinder. Similarly, the lines 46 in extension from the side walls 45 of each passage 32c, converge to intersection with the median plane at the point c thereof in the cylinder bore. The line in extension from one side wall of each port passage 32b, intersects the median plane at the point c thereof, while that line in extension from the opposite side wall of the passage intersects the median plane at a point b thereof in the cylinder bore. Finally, the line from one side wall of each port passage 32a, intersects the median plane at the point d thereof, while the line from the opposite side wall of the passage intersects the median plane at the point b thereof. While the above described intersection of the lines 46 with the median plane, is that obtaining in the plane of the sectional view of Fig. 2, the same character of intersection obtains between the planes of the side walls 45 and the median plane, with intersection appearing along lines in plane A—A passing through the points e, d, c, and b, but with the lines of intersection at an angle to the longitudinal cylinder axis in accordance with the degree of cant of the several port passages and ports thereof, as such canted condition is shown in Fig. 4.

With reference now to Figs. 3, 4, and 8, the upper row of air port passages 31 is provided by two sets or groups of such passages, the sets being arranged on opposite sides of the median plane A—A and relatively spaced apart by the arcuately long cylinder wall element 49 in the median plane. Each set or group comprises according to the present example, three air passages 31a, 31b, and 31c terminating in air ports 50 which as appears from Fig. 4, are disposed above and approximately in line with the three intermediate ports 40 provided by the lower air passages 32b, 32c, and 32d at the same side of the cylinder. As exemplified in Fig. 8, each of the passages 31a, 31b, and 31c, is of nozzle-form having the major extent of its top wall 52 inclined in the direction of port 50, toward the head end of the cylinder at an angle to the cylinder bore of approximately 35 degrees, and its bottom wall 53 similarly inclined over the major portion thereof and at approximately the same angle. Moreover and as viewed in Fig. 3, the side walls 54 of these passages in each set, lie in planes indicated by the broken line projections 56, which intersect the median plane A—A in the zone C thereof extending adjacent the cylinder wall at the side opposite the exhaust port passages 27. Consequently, the wall elements 57 between adjacent passages of each set, lie in planes which intersect the median plane in the same zone. The sets of passages as so formed and directed, serve to introduce jets of air through the ports 50 into the cylinder and upwardly therein in a columnar stream along the side of the cylinder opposite the exhaust port side thereof.

In like manner and for the same reason as presented in connection with the lower row of port passages 32a to 32e, the lines 56 in intersection with the median plane as viewed in the sectional view of Fig. 3, may represent the character of mutual air jet intersection at opposite sides of the median plane, as well as the passage wall directioning to obtain this result. As there appears, the lines 56 in extension from the side walls 54 of each port passage 31c, converge to intersection with the median plane at the point g thereof in the cylinder bore, while those lines from the side walls of each port passage 31b similarly converge to median plane intersection at the point h. One line 56 in extension from one wall of each port passage 31a, intersects the median plane at the point h, while the line from the opposite wall of the passages intersects the median plane at the point k thereof. Such is representative of the character of intersection between the planes of the side walls 54 and the median plane, and since the passages 31a, 31b, and 31c are not canted in the port arrangement according to Fig. 4, the intersections will appear along lines in plane A—A passing through the points g, h, and k, wherein the lines of intersection are parallel to the longitudinal axis of the cylinder.

As hereinbefore referred to, the frame 10 is formed to provide separate air delivery passages 35 each leading to one of the sets of upper air passages 31a, 31b, and 31c and having common communication with the inlet ends 58 of the passages. Air under desired blower pressure in the supply manifold 36, is supplied to each passage 35 under control of a uni-directional valve device 38 associated with the passage and exposed in the manifold as shown in Fig. 1. The valve devices 38 may be of any suitable type, adapted for permitting flow of air under pressure from the manifold through the valves into the passages 35, but preventing flow in the reverse direction through the valves.

Provided in the cylinder at the side thereof opposite the air port side, is a row of exhaust passages 27a, 27b, 27c, 27d, 27e, 27f, and 27g distributed in circumferentially spaced relation on opposite sides of the aforesaid median plane A—A and preferably symmetrically with respect thereto, over approximately one-half the cylinder circumference. The intermediate group of exhaust passages 27b to 27f terminate in exhaust ports 60 in the inner wall surface of the cylinder. The dimension of each port 60 in the longitudinal direction of the cylinder bore, is such that the port substantially spans the upper and lower rows of air ports as this is illustrated in Fig. 4 showing one embodiment of port arrangement. Moreover, port-formation by the passages 27b to 27f is such that each port is of somewhat wedge-shape or tapered form in frontal view (Fig. 4), having its wide end uppermost, while the ports on opposite sides of the center port 27d disposed in the median plane A—A and symmetrically related thereto, are canted in the manner shown. Since the wide end of these ports is uppermost, the greater area thereof will be uncovered first in the opening of the exhaust ports by the piston in the exhaust cycle, whereby to afford a desirable exposure of a large total exhaust port area at the outset of cylinder exhaust scavenging, to facilitate more rapid exhaust or so-called quick blow-down from the cylinder. The attainment of this result is considerably enhanced by the provision herein, of the additional end exhaust passages 27a and 27g each of which provides an exhaust port 61 (Figs. 3, 4, and 7) disposed in the inner wall surface of the cylinder in a zone above or over the adjacent end port 40 of air passage 32e. As will be observed from Fig. 4, the dimension of each end exhaust port 61 in the longitudinal direction of the cylinder bore, may be and preferably is less than one-half the corresponding dimension of the ports 60 of the intermediate group of exhaust port passages.

All of the exhaust passages 27a to 27g open into the common discharge chamber 28 formed by the engine frame, and the latter communicates with the exhaust discharge manifold 30 (Fig. 1). Preferably, also, the exhaust port arrangement in the preferred embodiment, is such that the top margins 62 of exhaust ports 60 and the top margins 64 of exhaust ports 61 are disposed substantially in a common plane transversely through the cylinder, as this will be appreciated from Fig. 4. Moreover and particularly in view of valve control of air delivery to the upper sets or groups of air ports 50, the latter may be arranged as shown in Fig. 4, such that the top margins 65 thereof lie substantially in the aforesaid plane of the top exhaust port margins 62 and 64.

Additionally with regard to the exhaust passages, the sectional view of Fig. 6 illustrates the presently preferred inclination of the top and bottom walls of each of the exhaust passages 27b to 27f. As there shown, the passage top wall 66 is inclined toward its port 60 and in the direction of the head end of the cylinder, by an angle of approximately 75 degrees to the cylinder bore, while the bottom wall 68 is inclined in like direction, by an angle of approximately 85 degrees to the cylinder bore. On the other hand and as shown in Fig. 7, each end passage 27a and 27g (27a being that shown) has its top wall 69 inclined in the same direction and at the same angle of 75 degrees to the cylinder bore, and its bottom wall 70 inclined in the same direction but at an angle of about 45 degrees to the cylinder bore.

Fig. 5 illustrates a modification as to the arrangement of exhaust and air ports, the chief differences over the port arrangement shown in the developed view of Fig. 4, residing in a reduction in the height of the intermediate air ports 72 in the lower row, and a similar reduction in the height of the ports 73 in the upper row. This permits a compacting of the indicated sets of ports, in the longitudinal direction of the cylinder bore such that the top margins of the air ports in the upper row are spaced from the transverse plane of the cylinder containing the top margins of the intermediate exhaust ports 74 and end exhaust ports 76. Consequently, piston opening of the exhaust ports in the exhaust or scavenging cycle, will occur ahead of piston opening of the upper row of air ports, so that with this arrangement valve control of air delivery to the upper ports 73 may be omitted without detracting unduly, from the scavenging and air charging effectiveness of the system.

In an engine having the presently preferred port system as now described, and operating on gaseous fuel with ignition attained in any suitable manner, as by a pilot charge of liquid fuel, it will be observed that as the piston moves to uncover the exhaust and air ports in the scavenging cycle, the large area ends of the exhaust ports are uncovered at the outset of the cycle to result in relatively rapid exhaust discharge with corresponding rapid reduction in cylinder pressure. Since at this point in the cycle, the upper row of air ports are uncovered to a like extent, some of the exhaust gases will pass through these ports into the separate air delivery passages 35 toward the closed valves 38. Because of this and for the purpose of controlling cylinder air charging as will appear presently, the passages 35 in the embodiment of the present invention are formed to have a total volume which is as small as is possible within practical design considerations. Consequently and because of the relatively rapid initial exhaust discharge, these passages will be quickly evacuated of exhaust gases, with resultant decrease of pressure therein to a value below the air pressure in the supply manifold 36, Air for cylinder scavenging then will be admitted past the valves and through the upper row of air ports 50 into the cylinder. Such air is directed by the ports in the manner hereinbefore described, to pass as air jets, upwardly in the cylinder toward the head end thereof and along the side of the cylinder opposite the exhaust port side.

With further port-uncovering displacement of the piston, the remainder of the exhaust port area will be uncovered, together with uncovering of the lower row of air ports 40. As the latter are opened, scavenging air enters the cylinder through these ports and is directed thereby to flow in jets upwardly in the cylinder in the side thereof opposite the exhaust port side. The air jets from both the upper and lower rows of air ports, combine to form a columnar stream of scavenging air of arcuate frontal form in the air port side of the cylinder, flowing upwardly in the cylinder, thence across the cylinder at the head end and in the combustion chamber space 15 of the cylinder head 12, and then downwardly in the cylinder along the exhaust port side thereof, to the exhaust ports. Thus an effective back flow or loop scavenging of the exhaust gases is obtained, the scavenging air column formed and directed to flow in the flow path described, displacing the exhaust gases and expelling the same through the exhaust ports to ultimate discharge through the exhaust manifold 30. By the described directioning of the air port passages in both the upper and lower rows thereof, scavenging air delivery into the cylinder is such as to preclude short-circuiting flow of scavenging air across the cylinder from the air ports to the exhaust ports.

Upon reversal of piston displacement, cylinder scavenging is completed and charging of the cylinder with fresh combustion air takes place up to piston closure of the exhaust ports and the upper row of air ports. It is important to note here that the present improvements afford the provision of a bottom row of air ports extending in an arc over appreciably more than half the cylinder circumference, with each port having a relatively large port area which is greater than that of the individual ports in the upper row as may be observed from Fig. 4. This decidedly facilitates the attainment of an air and exhaust port relationship such as that here provided, in which the ratio of total air port area to total exhaust port area obtaining during the main part of the cylinder air charging cycle, approaches the practical optimum ratio determined for efficient and effective air charging in a two cycle high compression engine running on gaseous fuel as here contemplated. The final combustion air charge present in the cylinder following piston closure of the exhaust and air ports, is then more readily controlled as to volume and condition for proper mixture with the gaseous fuel, through the smaller area air ports of the upper row. It is to be observed that by reason of the valve control of air supply through the upper ports and the port relation in which the top margins of the exhaust ports and the upper row of air ports are at about the same level, as in a common plane transversely through the cylinder, a desirable increased mean effective scavenging and air charging pressure is obtained in the cylinder. Moreover and importantly to the attainment of thorough mixture of air and gaseous fuel in proper combustion proportions, and the avoidance of gaseous fuel stratification as well as the formation of cylinder pockets of rich, detonating mixtures of fuel and air, the air directioning control afforded by the air ports and particularly such control as is provided by the upper row of air ports prior to piston closure thereof, is most effective to these ends. The columnar movement of air in the cylinder in the indicated path about the cylinder center or core, not only prevents the establishment of rich mixture pockets, but assures such distribution of air throughout the cylinder as to result in thorough commingling and diffusion of air and gaseous fuel to form a proper mixture for efficient combustion. The result of the foregoing is improved engine operation with increased power output.

As will be observed in Fig. 1, the head end or crown 18 of the piston 16 is formed to have a frusto-conical shape in exterior aspect, with the inclination of the frusto-conical surface 80 arranged at an angle an approximately 35 degrees to the cylinder bore. Such inclination of the crown surface 80 is equivalent to the inclination of the top walls of all of the air port passages, so that the crown surface provides in effect, an extension of the port passages as this may be observed from Fig. 1. The piston crown surface 80 thus is adapted for cooperation with the air port passages of both the upper and lower rows thereof, to assist passage directioning of air jet admission to the cylinder and in so doing, to aid in preventing short-circuiting of scavenging air flow to the exhaust ports. The piston crown surface 80 also coacts with the exhaust port passages in exhaust discharge from the cylinder, by providing a desirable directioning of exhaust flow into the exhaust port passages.

While the described canting of a majority of both the air ports and the exhaust ports, as illustrated by Figs. 4 and 5, is highly desirable particularly in respect to the air ports for assisting in obtaining the improved directioning of air jet introduction to the cylinder, such port canting is of importance to the minimizing of port-snagging of the piston rings with resultant ring deterioration. Also, avoidance of ring deterioration in this respect, is enhanced by the port arrangement now provided, wherein by reason of the addition of the smaller end exhaust ports 61 (Fig. 4) and 76 (Fig. 5), the circumferential cylinder arc containing the remaining exhaust ports is somewhat less than otherwise would be required.

The presently improved cylinder port arrangement as now described and illustrated, fully attains all of the hereinmentioned objects of the invention, as well as other objects and advantages now apparent. It is desired to point out in particular here, that the port system as herein disclosed, so improves cylinder scavenging and air charging as to increase the net power output of the engine, while affording an appreciable reduction in blower air supply over volumetric requirements obtaining with port systems of heretofore known and prevailing forms. Consequently, with less air required in the present system, the air supply blower may be of correspondingly reduced blower horsepower requirement, with resultant corresponding enhancement in the net power output of the engine.

It is to be noted here that while the air ports in the upper and lower sets thereof, are shown to be distributed symmetrically with respect to the median plane A—A, the ports of the upper set in particular, may be arranged in non-symmetrical relation to such plane in greater or lesser degree as may be desired, or there may be a greater number of such ports on one side of the plane than on the other side. Such modifications will serve to produce a twist or spiral effect in the columnar flow in the cylinder, such as to enhance the mixing of air and fuel.

Having now described and illustrated the present invention, what is claimed:

1. In an internal combustion engine, a cylinder having exhaust passages in the wall thereof terminating in exhaust ports in the inner surface of the cylinder wall, with the exhaust ports in circumferentially spaced relation throughout substantially half the cylinder circumference, the top margins of the exhaust ports lying in a common plane transversely of the cylinder and each end exhaust port having a dimension longitudinally of the cylinder less than the corresponding dimension of the remaining exhaust ports, said cylinder providing a plurality of air passages in the wall thereof and arranged such that certain of the air passages terminate in a first row of air ports in the inner surface of the cylinder wall in circumferentially spaced relation over more than half the cylinder circumference, with the end ports of said row substantially underlying said end exhaust ports, while the remaining air passages terminate in a second row of air ports in the inner surface of the cylinder wall disposed above the first row of air ports and in circumferentially spaced relation over less than half the cylinder circumference, all of said air passages being directed at an inclination toward one end of the cylinder, and the number of ports in said second row of air ports being less than the number of ports in said first row of air ports.

2. In an internal combustion engine, a cylinder as defined by claim 1 characterized further in that the said exhaust ports extend symmetrically on opposite sides of a median plane through the center of the cylinder, and in that said certain air passages and said remaining air passages have the walls between adjacent passages thereof on both sides of said median plane, disposed in planes intersecting said median plane in a zone thereof remote from the exhaust ports.

3. In an internal combustion engine, a cylinder having passages in the wall thereof forming air ports arranged in rows one above another, the passages of each port row extending on opposite sides of a median plane through the center of the cylinder and all of the passages being inclined toward one end of the cylinder, said passages of each port row having the walls between adjacent passages thereof on both sides of said median plane, disposed in planes intersecting said median plane in a zone thereof relatively adjacent one side of the cylinder wall, there being a wall element in said median plane at said one side of the cylinder wall, separating those air ports of one row which are nearest the median plane and a second wall element in the median plane separating those air ports of another row which are nearest the median plane, said one row of air ports being nearer said one end of the cylinder than said another row of air ports, and the first said wall element being greater in extent circumferentially of the cylinder, than the said second wall element.

4. In an internal combustion engine, a cylinder having a plurality of air passages in the cylinder wall providing upper and lower sets of air ports in the inner wall surface of the cylinder, the air ports of each set extending on opposite sides of a median plane through the center of the cylinder and the passages of each set of ports being inclined toward one end of the cylinder and having the walls between adjacent passages thereof on both sides of said median plane, disposed in planes intersecting the median plane in a zone thereof relatively adjacent the cylinder wall, said cylinder further having a group of exhaust passages in the cylinder wall providing a corresponding group of exhaust ports in the inner wall surface of the cylinder, each exhaust port in said group having a dimension longitudinally of the cylinder approximately the distance as measured in the longitudinal direction of the cylinder, between the top margin of an air port in said upper set and the bottom margin of an air port in said lower set, and the cylinder having other exhaust passages in the cylinder wall providing at least one additional exhaust port in the inner surface of the cylinder wall at each end of said group of exhaust ports and in a position above an end air port of said lower set of air ports.

5. In an internal combustion engine, a cylinder as defined by claim 4 wherein the top margins of the said additional exhaust ports and the top margins of the ports in said group of exhaust ports, are substantially in a common plane transversely through the cylinder.

6. In an internal combustion engine, an engine frame, a cylinder supported in the frame, said cylinder having a plurality of air passages in the cylinder wall substantially at one side of the cylinder, certain of said passages terminating in a first set of cylinder air ports arranged in a row extending on opposite sides of a median plane through the cylinder center, others of said air passages terminating in a second set of cylinder air ports arranged in a row at one side of said median plane and above the first mentioned row of air ports, and the remainder of said air passages terminating in a third set of cylinder air ports arranged in a row at the opposite side of said median plane and above the first mentioned row of air ports, said second and third sets of air ports having the end ports thereof nearest said median plane spaced apart by a distance materially greater than the distance separating the adjacent pair of ports of said first set nearest the median plane; said cylinder providing a plurality of exhaust passages in the cylinder wall at the opposite side of the cylinder, the exhaust passages terminating in cylinder exhaust ports arranged in a row extending on opposite sides of said median plane, with the exhaust port at each end of said row disposed substantially above an end air port of said first set of air ports; all of said plurality of air passages being inclined toward one end of the cylinder, the passages of said first set of air ports having the walls between adjacent passages thereof on both sides of said median plane, disposed in planes intersecting the median plane in a zone thereof remote from the exhaust ports, and the passages of said second and third set of air ports having the walls between adjacent passages thereof disposed in planes intersecting said median plane in said zone thereof; said frame providing an air delivery passage in common communication with the air passages of said second set of air ports and a separate air delivery passage in common communication with the air passages of said third set of air ports, and a unidirectional valve in control of each air delivery passage.

7. In an internal combustion engine, an engine frame, a cylinder supported in the frame, the cylinder having exhaust port passages providing a row of exhaust ports in the cylinder wall, the exhaust port row being arranged symmetrically with respect to a median plane through the center of the cylinder and extending over substantially half the cylinder circumference, the top margins of said ports lying in a common plane transversely of the cylinder and the end port at each end of the row having a port height longitudinally of the cylinder, substantially less than the port height of the remaining exhaust ports, the cylinder further having a first set of air port passages providing a row of air ports in the cylinder wall arranged substantially symmetrically relative to said median plane and extending over greater than half the cylinder circumference, with the air port at each end of the row substantially underlying the end exhaust port at the corresponding end of the exhaust port row, and other sets of air port passages providing additional air ports above the first said row of air ports, said additional air ports being arranged in separate, spaced apart rows with one such row on each side of said median plane, said other sets of air port passages being inclined toward one end of the cylinder and directed toward the side of the cylinder opposite the side thereof containing said exhaust ports, and said engine frame providing separate air delivery passages each communicating with a set of said other sets of air port passages.

8. In an internal combustion engine, the subject matter according to claim 7, wherein the said first set of air port passages are inclined toward one end of the cylinder and are directed substantially toward the side of the cylinder opposite the side thereof containing the said exhaust ports.

9. In an internal combustion engine, an engine frame, a cylinder supported in the frame, the cylinder having a plurality of port passages terminating in main exhaust ports, auxiliary exhaust ports and air ports in the cylinder wall, all of said ports being confined substantially to a single cylinder port belt of a width longitudinally of the cylinder, substantially commensurate with the height of the main exhaust ports, said main exhaust ports being arranged in a row extending symmetrically with respect to a median plane through the center of the cylinder, said auxiliary exhaust ports being arranged to provide one such port at each end of said row of main exhaust ports, the top margins of the main and auxiliary exhaust ports lying in a common plane transversely of the cylinder and the height of each auxiliary exhaust port being less than the height of the main exhaust ports, certain of said air ports being arranged in a first row extending symmetrically with respect to said median plane and having the air port at each end of the row substantially underlying the auxiliary exhaust port at the corresponding end of the exhaust port row, the remaining air ports being above said first row of air ports and arranged to provide separate, spaced apart air port rows with one such row on each side of said median plane, and the port passages terminating in said remaining air ports being inclined toward one end of the cylinder and directed toward the side of the cylinder opposite the side thereof containing said main exhaust ports.

10. In an internal combustion engine, the subject matter according to claim 9 wherein the port passages terminating in the air ports of the said first row, are inclined toward one end of the cylinder and are directed substantially toward the side of the cylinder opposite the side thereof containing the said main exhaust ports.

11. In an internal combustion engine, the subject matter according to claim 9 wherein the said engine frame provides separate air delivery passages each communicating with the port passages of one of the said separate, spaced apart air port rows.

References Cited in the file of this patent

UNITED STATES PATENTS

| | | |
|---|---|---|
| 1,689,834 | Kreissle | Oct. 30, 1928 |
| 1,973,859 | Thomann | Sept. 18, 1934 |
| 2,038,271 | Curtis | Apr. 21, 1936 |
| 2,044,552 | Walti | June 16, 1936 |
| 2,128,855 | Schenker | Aug. 30, 1938 |
| 2,187,287 | Tobler | Jan. 16, 1940 |
| 2,218,202 | Lieberherr | Oct. 15, 1940 |
| 2,393,342 | Schneider | Jan. 22, 1946 |

FOREIGN PATENTS

| | | |
|---|---|---|
| 146,936 | Switzerland | July 16, 1931 |
| 304,181 | Italy | Dec. 29, 1932 |
| 590,851 | Great Britain | July 30, 1947 |